(12) United States Patent
Murray et al.

(10) Patent No.: US 8,574,943 B2
(45) Date of Patent: Nov. 5, 2013

(54) METHOD FOR MANUFACTURING SOLAR CELLS

(75) Inventors: Paul Murray, Queanbeyan (AU); Paul Moonie, Queanbeyan (AU); Renai Platts, Queanbeyan (AU)

(73) Assignee: Dyesol Industries Pty Ltd, New South Wales (AU)

( * ) Notice: Subject to any disclaimer, the term of this patent is extended or adjusted under 35 U.S.C. 154(b) by 580 days.

(21) Appl. No.: 12/677,384

(22) PCT Filed: Sep. 10, 2008

(86) PCT No.: PCT/AU2008/001340
§ 371 (c)(1),
(2), (4) Date: Apr. 29, 2010

(87) PCT Pub. No.: WO2009/033214
PCT Pub. Date: Mar. 19, 2009

(65) Prior Publication Data
US 2010/0206461 A1    Aug. 19, 2010

(30) Foreign Application Priority Data

Sep. 10, 2007  (AU) ............................... 2007904863

(51) Int. Cl.
*H01L 21/00*  (2006.01)
(52) U.S. Cl.
USPC .............. 438/57; 136/251; 136/263; 136/265
(58) Field of Classification Search
USPC .............................. 136/263, 265, 251; 438/57
See application file for complete search history.

(56) References Cited

U.S. PATENT DOCUMENTS

| | | | |
|---|---|---|---|
| 4,318,938 A | 3/1982 | Barnett et al. | |
| 4,761,061 A * | 8/1988 | Nishiyama et al. | 359/265 |
| 5,233,461 A * | 8/1993 | Dornan et al. | 359/272 |
| 5,830,597 A * | 11/1998 | Hoffmann et al. | 429/111 |
| 5,856,211 A * | 1/1999 | Tonazzi et al. | 438/69 |
| 6,248,949 B1 * | 6/2001 | Turner | 136/244 |
| 6,265,242 B1 | 7/2001 | Komori et al. | |
| 6,317,248 B1 * | 11/2001 | Agrawal et al. | 359/265 |
| 6,333,457 B1 | 12/2001 | Mulligan et al. | |
| 6,344,301 B1 * | 2/2002 | Akutsu et al. | 430/7 |
| 6,924,427 B2 | 8/2005 | Eckert et al. | |
| 7,592,540 B2 * | 9/2009 | Park et al. | 136/263 |
| 7,952,785 B2 * | 5/2011 | Karmhag et al. | 359/265 |
| 8,158,879 B2 * | 4/2012 | McGregor et al. | 136/252 |
| 2001/0004901 A1 * | 6/2001 | Yamanaka et al. | 136/263 |
| 2003/0127130 A1 * | 7/2003 | Murai et al. | 136/263 |
| 2004/0211458 A1 * | 10/2004 | Gui et al. | 136/244 |
| 2005/0009224 A1 * | 1/2005 | Yang et al. | 438/57 |
| 2005/0229966 A1 * | 10/2005 | Komiya et al. | 136/263 |

(Continued)

FOREIGN PATENT DOCUMENTS

| | | |
|---|---|---|
| EP | 0855726 | 1/1997 |
| EP | 1509934 | 3/2005 |

(Continued)

*Primary Examiner* — Kimberly Rizkallah
*Assistant Examiner* — Caleb Henry
(74) *Attorney, Agent, or Firm* — Davis & Bujold, PLLC; Michael J. Bujold

(57) ABSTRACT

Methods and materials used to manufacture a series of substantially identical solar cells which then can be assembled into arrays of various designs, as required, to achieve the desired electrical output. The invention is described with reference to producing dye solar cells.

22 Claims, 7 Drawing Sheets

(56) References Cited

U.S. PATENT DOCUMENTS

| | | | |
|---|---|---|---|
| 2006/0070651 A1* | 4/2006 | Kang et al. | 136/256 |
| 2006/0157103 A1* | 7/2006 | Sheats et al. | 136/244 |
| 2006/0231135 A1* | 10/2006 | Murai et al. | 136/252 |
| 2007/0044835 A1* | 3/2007 | Yoshimoto et al. | 136/263 |
| 2007/0120178 A1* | 5/2007 | McGregor et al. | 257/321 |
| 2007/0122930 A1* | 5/2007 | McGregor et al. | 438/57 |
| 2007/0122931 A1* | 5/2007 | McGregor et al. | 438/57 |
| 2007/0137702 A1* | 6/2007 | Murai et al. | 136/263 |
| 2007/0160940 A1* | 7/2007 | Kubo et al. | 430/620 |
| 2007/0201187 A1* | 8/2007 | McGregor et al. | 361/503 |
| 2008/0072954 A1* | 3/2008 | Chang et al. | 136/251 |
| 2008/0202585 A1* | 8/2008 | Yamanaka et al. | 136/263 |
| 2008/0308155 A1* | 12/2008 | Fukui et al. | 136/261 |
| 2008/0314448 A1* | 12/2008 | Kato et al. | 136/261 |
| 2010/0009494 A1* | 1/2010 | Choi et al. | 438/69 |
| 2012/0171808 A1* | 7/2012 | McGregor et al. | 438/85 |

FOREIGN PATENT DOCUMENTS

| | | |
|---|---|---|
| JP | 2007073401 | 3/2007 |
| JP | 2007157397 | 6/2007 |
| JP | 2007220608 | 8/2007 |

* cited by examiner

METHOD FOR MANUFACTURING SOLAR CELLS

This application is a national stage completion of PCT/AU2008/001340 filed on Sep. 10, 2008 which claims priority from Australian Application Serial No. 2007904863 filed on Sep. 10, 2007.

TECHNICAL FIELD

This invention relates to methods and materials used to manufacture a series of substantially identical solar cells, which then can be assembled into arrays of various designs as required to achieve the desired electrical output. The invention is described with reference to producing dye solar cells.

BACKGROUND TO THE INVENTION

Solar cells are devices which perform two main functions, the first being the photo generation in light absorbing material/s of electron and hole charge carriers, and the second being the subsequent separation of these charge carriers to a conductive contact to facilitate electron transfer.

Typically, solar cells are assembled together to form an array. Performance of an array of cells is generally improved if the cells in the array are of similar construction and composition. Accordingly, it would be advantageous to produce a large number of very similar cells.

Solar cells of the type known as dye solar cells include a layer or region of electrolyte. Usually, the cell is partially formed and sealed and then filled with electrolyte. The filling takes place by introducing the electrolyte through a fill hole or other aperture which can be technically challenging and/or wasteful. It would be advantageous to devise an improved method of introducing electrolyte to a cell.

SUMMARY OF THE INVENTION

In a first aspect the present invention provides a method for manufacturing at least one solar cell including the steps of: providing at least two substrates; at least partially forming at least one cell by applying portions of a low melting point gasket material to some regions of a substrate and applying portions of high melting point gasket material to other regions of a substrate; activating the lower melting point gasket material; filling the at least one cell defined by the gasket materials with an electrolyte; and activating the higher melting point gasket material.

The at least one solar cell may be flexible.

The at least one solar cell may be a photoelectrochemical cell.

The photoelectrochemical cell may be a dye solar cell.

Either of the substrates may include a metal foil or coated metal foil.

Either of the substrates may include a glass, ceramic or polymeric material.

The method may further include the step of applying a layer of semiconductor wherein the semiconductor of the dye solar cell may be titanium dioxide, ZnO, $SnO_2$, niobium oxide, or any combination of those materials with or without alkali and alkaline earth oxides, rare earth oxides, and other transition metal oxides or a semiconducting polymer.

The semiconductor may be deposited in one or more layers on a number of cells simultaneously by a technique selected from screen printing, doctor blading, spray deposition, dipping, tape casting, gravure printing or combination of these or similar technique to achieve a thickness after heat and/or pressure treatment of between 50 nm and 25 microns.

The substrate with deposited semiconductor may be processed by heat and/or pressure, with the option of deposition of a concurrent or subsequent application of a sol material such as a solution of Titanium tetrachloride to produce working electrodes suitable for dye application.

The electrodes may be subsequently dyed with one or more dyes to produce a set of interconnected working electrodes.

The method may further include the step of applying to each electrode a polymeric or ormocer gasket.

The method may further include the step of applying a catalyst whereby the catalyst may be dispersed Pt or Pt alloy or mixture, carbon, PEDOT, Ru oxide or a combination thereof.

The catalyst may be deposited by one or more of screen printing, spraying, doctor blading, dipping, thermal decomposition, CVD, sputtering, PVD, chemical reduction and UV initiated reduction.

The steps of activating may involve use of a reflow oven to liquidise and subsequently cure on cooling the gasket material.

The steps of activating may involve application of non-localised heat by a flat heat press or roller.

The electrolyte may be either of either a redox electrolyte or a hole conductor.

The electrolyte may include pigment additives present to achieve altered visual colouration.

The electrolyte may be introduced via an edge aperture.

The method may further include the step of depositing busbars onto a counter electrode prior to cell assembly by deposition of a heat curable or low temperature conductive ink or low temperature curing solder paste or a combination thereof.

The cutting technique used to separate the substrate may include any one of laser scribing or jet milling.

A plurality of solar cells may be formed between the substrates.

The method may further include the step of separating at least some of the at least partially formed cells by separating the substrates using a cutting technique.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
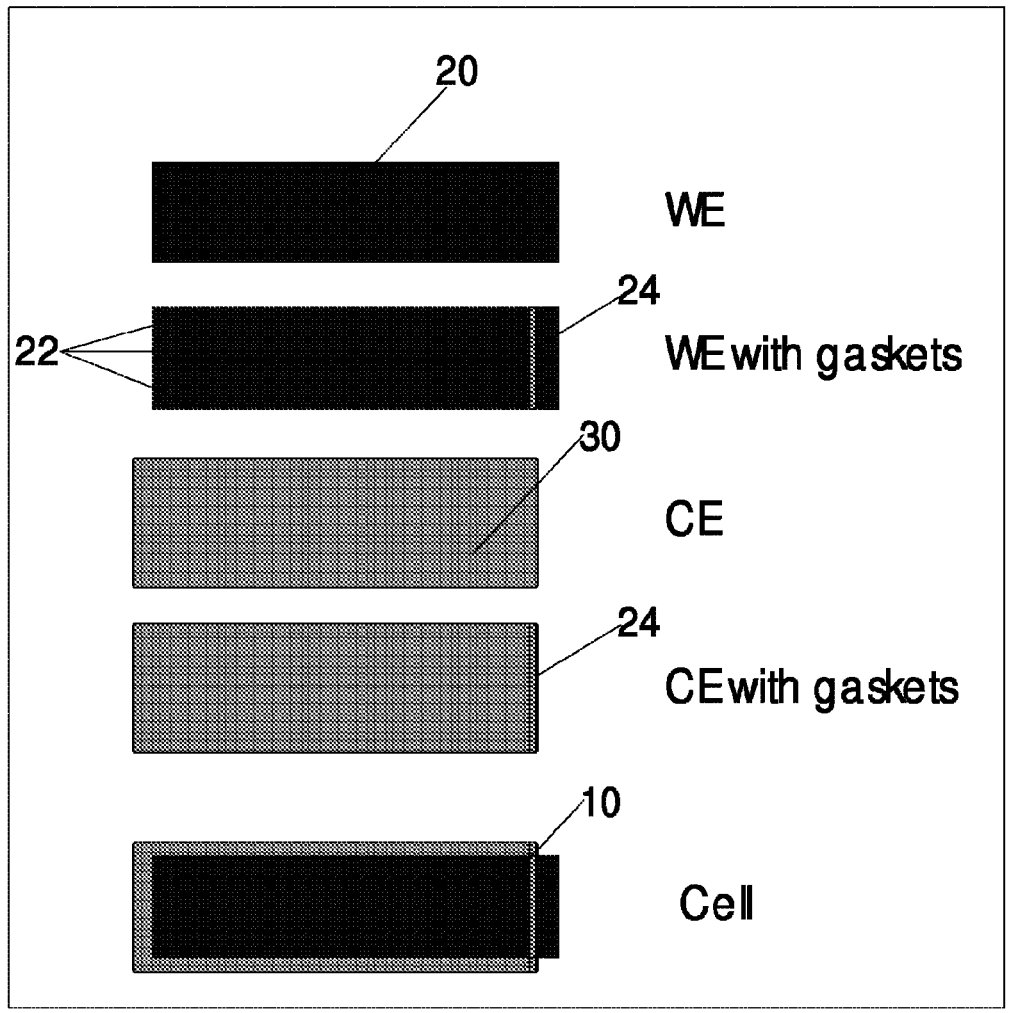
FIG. 1 is a schematic view illustrating a manufacturing principle according to an embodiment of the invention with reference to forming a single cell.

The embodiments that will now be described relate to methods for the batch or continuous (roll-to-roll) manufacture of a series of flexible dye solar cells whereby the resulting individual cells can be assembled to form an array of any desired configuration. The flexible dye solar cells described herein comprise two substrates, a metal foil substrate for the working electrode (WE) and an essentially transparent polymeric counter electrode (CE) substrate having a coating of a transparent conductor applied thereon. The method also applies to any conducting substrate materials with modifications to the active layer composition and sintering conditions required to utilise low melting temperature substrates for the working electrode that would be apparent to those skilled in the field.

The embodiment of flexible solar cell manufacturing method now described comprises the steps of:

production of a templated WE substrate formed by machining into 'snap-strate' electrodes (i.e. elements that may be later separated by breaking or cutting tabs between the elements);

deposition of the working semiconductor onto the templated WE snap-strate;

heat treatment of the WE under ambient or high pressure to form an interconnected nanoparticulate electrode;

application of dye to the electrode to form the working electrode;

application of a gasket separator to the working electrode;

application of a catalyst to the counter electrode substrate by vacuum deposition, chemical reduction or electrochemical reduction;

application of a gasket separator to the counter electrode;

combining the WE and CE under heat and pressure to achieve cell sealing;

filling of the electrolyte through cell edge aperture;

optional gellation of the electrolyte by application of heat or UV;

edge aperture sealing under heat and pressure;

subsequent processing into individual cells by laser cutting the counter-electrode and cutting or breaking the interconnecting tabs to remove the cells from the template.

Embodiments of the invention enable manufacture of a plurality of essentially identical solar cells by a batch or continuous process. The principle of the process involves the use of a templated set of substrates. For illustration an example is the manufacture of flexible metal based dye solar cells. The cells consist of a metallic foil substrate on which a nanoparticulate nanoporous semiconductor film is deposited. This film is subsequently dyed and a gasket is applied to the metal foil around the edges of the semiconductor to produce the working electrode. A counter electrode film comprising a transparent polymeric film coated with a transparent conductive oxide and a catalyst is prepared and busbars are deposited onto the rims of the counter-electrode. The counter electrode is partially bonded to the working electrode. Electrolyte is introduced into the assembly and the cells are subsequently sealed.

The first step of manufacture involves the preparation of a plurality of substrates by laser cutting a sheet of metal foil to produce substrates that are connected by tabs. The key elements are control of laser power to prevent formation of rough edges and design of the tab dimensions to ensure that the template can be processed without damage but that cells be easily separated at a later stage of processing. By this process, the cell substrates are identical and have no burrs that could produce short circuits. The process can be carried out on sheets of substrate material or on continuous strip. The advantage of the process from a commercial viewpoint is that it reduces labour in later stages of manufacture and reduces variability between cells as the same form factor is used for all cells. There is virtually no limitation to size of the substrate for each individual cell subject only to size of the raw material stock and limitation imposed by processing equipment.

The WE substrate is a metal foil such as Titanium, Stainless Steel, Coated Steel, Aluminium, Coated Aluminium. The cell design is created in software to enable automatic laser cutting of the snap-strate. Raw material dimensions are optimised for maximum use of the material. Usually a continuous edge is allocated to ensure that the snap-strates will not be damaged in further processing.

The CE substrate is a transparent plastic (typically PET or PEN) coated with an essentially transparent conductor such as ITO or FTO, with a transparent catalytic layer such as Platinum, PEDOT, $RuO_2$ or Graphite. The CE may be laser cut to appropriate dimensions for the cell design or may be used as a single (or continuous) sheet and be cut at a later stage of processing.

Prior to laser cutting, the WE substrate is usually pretreated to optimise adhesion of the semiconductor and to ensure that the surface is uniform. This is carried out by either or both of etching and mechanical abrasion/polishing followed by cleaning to remove grease and swarf. After laser cutting, the substrates are washed with a degreaser in water and/or organic solvents and dried. The WE substrate is coated with a semiconductor layer such as $TiO_2$. Methods of deposition of the semiconductor include screen printing and gravure printing using a segmented roller. In the case of screen printing, the size of each 'sub-batch' of subsequent cells depends on the maximum printing area of the screen. In the case of a continuous strip of snap-strates, the screen printer must be integrated into the continuous line.

Different thickness of the films may be achieved by changing paste and deposition conditions over a range from about 50 nm to 25 micron. The thicker multi-micron films may require more than one coating application. The printed substrates are dried and fired or 'hot' pressed to produce an interconnected porous nanoparticulate network. Optionally, the semiconductor films are post-treated by dipping in a dilute solution of titanium tetrachloride and then reheated to improve the interconnection between $TiO_2$ particles.

The semiconductor is then dyed usually by dipping in a bath of dye or by one of the commonly used means such as ink-jet printing. Commonly Ruthenium based dyes are used, but the invention does not rely on any particular dye. The counter-electrode (CE) is usually available either as sheets or continuous roll. For polymeric substrates such as PEN, the CE catalyst is deposited usually by sputtering or chemical reduction in a separate production line. WE and CE substrates are assembled using a spacer such as thermoplastic film (Dupont Surlyn 1702 50 um).

At this stage a thermoplastic gasket base such as Paramelt Aquaseal, Dupont Surlyn 1702 or Dupont Bynel 4164 can be applied around the edges of the semiconductor to form a primary seal. Application can be achieved by dispensing of a liquid suspension, extrusion of a resin, or hot melt screen printing and subsequently dried in a belt oven to produce an adherent film. Alternatively preformed film type gaskets can be applied and adhered to the surface of the substrate via hot pressing.

The thermoplastic film is pre-formed into a series of gaskets which are applied to both the WE and CE. A low temperature thermoplastic is used to form three sides of the gasket whilst a higher temperature activating thermoplastic is employed to seal the remaining side of the cells. These are secured in position by tacking at over 150 degrees Celsius.

Referring to FIG. 1, the manufacturing process is illustrated in the simple case of a single cell. The working electrode 20 is comprised of a foil substrate, to which has been applied a layer of Titania which has been dyed. A low temperature gasket 22 has been applied about three sides of the working electrode. A strip of high temperature gasket 24 is applied to one edge of the working electrode. A portion of high temperature gasket material 24 has been applied to one edge of the counter electrode 30. The electrodes are overlaid by a technique such as pick and place and/or templated assembly ensuring the pre-applied gaskets are aligned. The cell 10 is sealed by heat activation, with equipment such as a roller press or patterned press, to activate the low temperature gasket material 22 thus sealing three sides of the cell leaving open the cell edge aperture to which the high temperature gasket material 24 has been applied. A redox electrolyte is admitted between the WE 20 and CE 30 through the edge aperture between the portions of high temperature gasket material 24 via vacuum assisted backfilling to facilitate contact with both electrodes and to eliminate voids. A combination of positive and negative pressure can be employed to facilitate fast and efficient electrolyte filling. The unsealed edge is then sealed by localised heat activation of the high temperature thermoplastic material 24 to yield an electrolyte filled, sealed cell 10.

Figure 2:
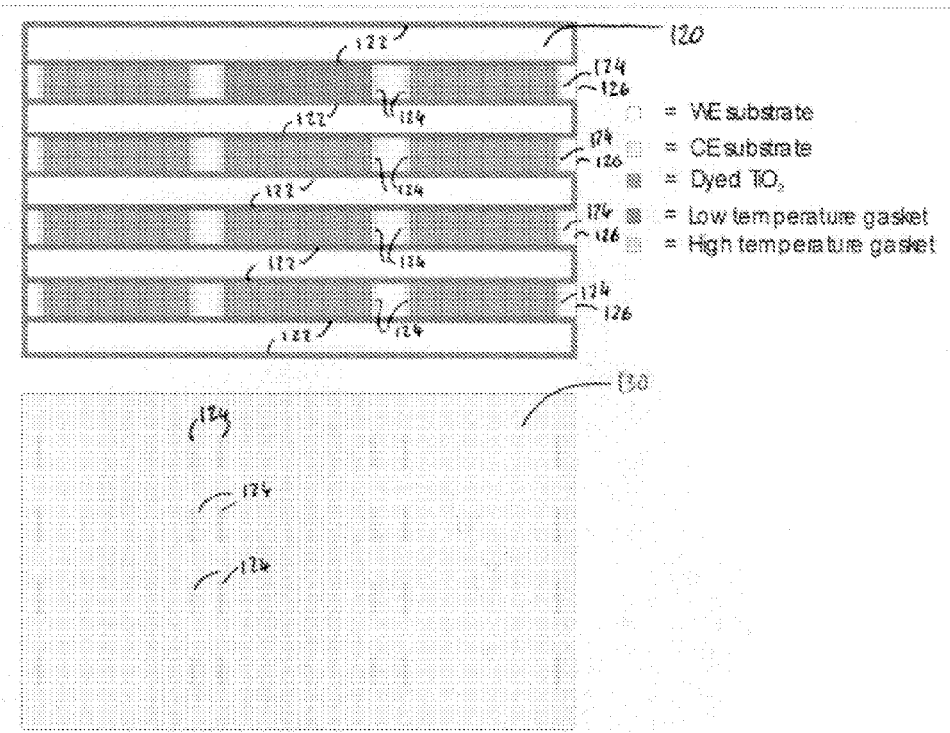
FIG. 2 shows a working electrode and counter electrode for forming a plurality of cells with sealants applied.

Referring to FIG. 2, manufacture of a plurality of cells in a batchwise or continuous manner is illustrated. Working electrode substrate 120 has been machined by laser cutting to produce tabs for later cell separation. Portions of low melting point gasket material 122 have been applied in horizontal strips. Portions of high melting point gasket material 124 have been applied in vertical strips. A counter electrode 130 is shown to which has been applied vertical strips of the high melting point gasket material 124 to align with the high temperature gasket material portions on the working electrode 120.

The working electrode 120 and counter electrode 130 are then aligned and brought together and the resulting assembly is put through a first series of heated rollers which seals the lower temperature thermoplastic material 122 leaving the higher temperature thermoplastic material 124 unsealed. The arrays of interconnected cells are thus lined by sealed low temperature gasket material 122 top and bottom. This sealing arrangement is repeated in a plurality of adjacent rows. Electrolyte can then be introduced at unsealed edges 126.

Post electrolyte filling via the edge apertures the substrates are passed through a second series of heated roller assemblies which seal the higher temperature thermoplastic regions 124 completing the cell sealing process. The cells are then separated by use of a $CO_2$ laser to divide the counter-electrode substrates and mechanical snapping of the metal substrate.

Figure 3:
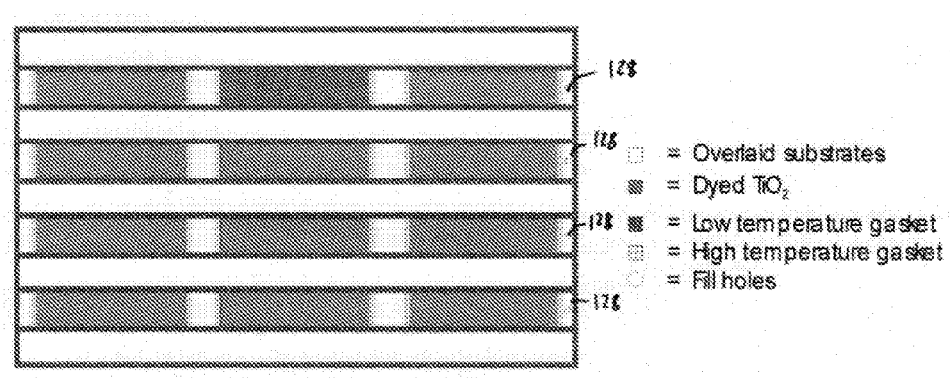
FIG. 3 illustrates use of fill holes to introduce electrolyte into a plurality of cells.

Referring to FIG. 3, an alternative method of introduction of an electrolyte involving use of fill holes and subsequent optional in-situ gellation of the electrolyte is illustrated. This manufacturing method is similar to that illustrated in FIG. 2, except no edge apertures are formed for electrolyte filling. Instead, filling is achieved by use of fill holes 128. The fill holes 128 can be on either the WE 120 or CE 130 substrate. Fill holes 128 are made by laser cutting, drilling or micro sand-blasting. One fill hole 128 is used to service each row of cells. In the illustrated example, the substrate consisting of 4 rows of 3 cells would require 4 fill holes 128. The lower temperature thermoplastic regions 122 are sealed similarly to that described above for edge sealing. The main difference being that the primary seal 122 is achieved between the WE 120 and CE 122 substrates around the perimeter of the entire device. The fill holes 128 only allow access to the open regions of each row. An electrolyte filling machine utilising vacuum assisted filling is used to admit redox electrolyte to the rows and therefore the cells. A second series of heated rollers as described above is used to seal the higher temperature thermoplastic regions of either side of each cell and the fill hole whilst still incorporating redox electrolyte. Post assembly cell division is achieved as described above.

The WE can be processed in a continuous manner; this includes laser division, semiconductor deposition, drying, sintering, dye application, and primary seal application. The resultant WE and pre-prepared CE substrates are brought together with primary sealing of the continuous WE and CE substrates, electrolyte deposition, cell final sealing and cell division via laser cutting of the assembled solar cells through the CE and/or snapping of the metal tabs on the WE substrate. The WE substrate is a metal foil such as Titanium and the CE substrate a conductor coated plastic such as ITO:PEN or ITO:PET with a transparent catalytic layer such as Platinum, PEDOT, $RuO_2$ or Graphite. Laser cutting is achieved with Nd-Yag and $CO_2$ lasers for WE and CE substrates respectively. The semiconductor layer consists of Titania with dye adsorbed thereon. Primary seal material may consist of thermoplastics such as Surlyn, Bynel, or Aquaseal liquid, or a combination thereof. Redox electrolyte is deposited with vacuum assistance to eliminate voids and the sealing is completed.

Figure 4:
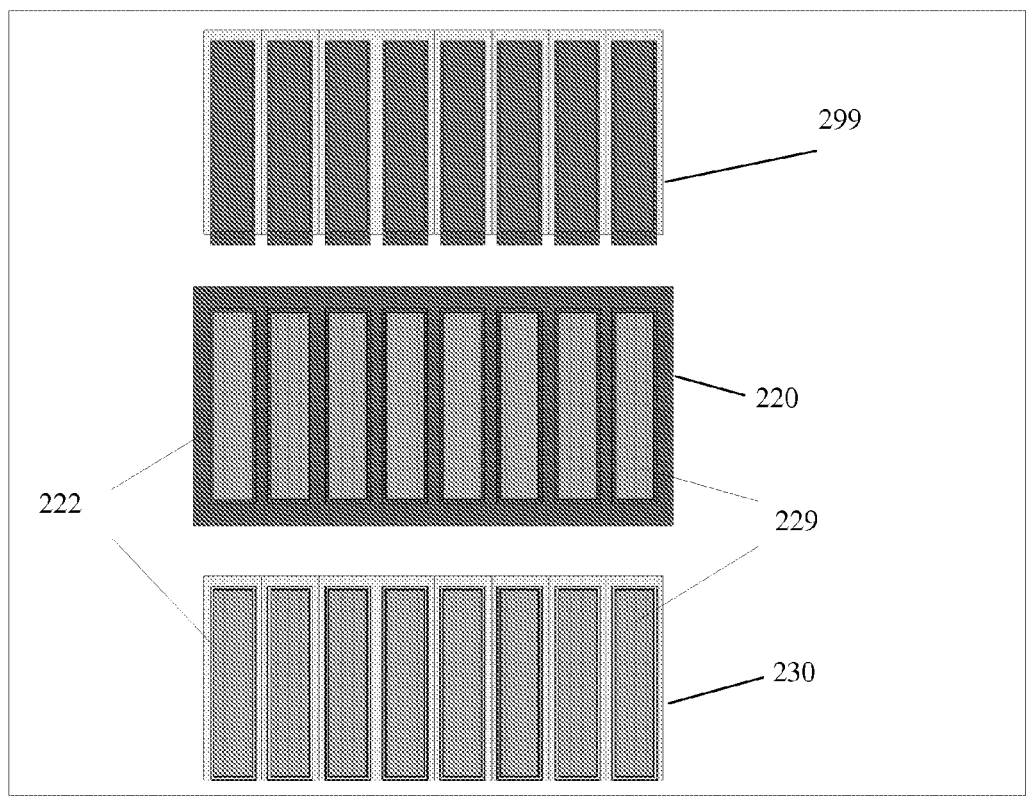
FIG. 4 illustrates an alternative embodiment of the invention wherein electrolyte is applied before substrates are joined.

Referring to FIG. 4, another embodiment suitable for an alternative method of electrolyte introduction and sealant arrangement is illustrated. This manufacturing method is similar to that illustrated in FIG. 3, however no edge aperture used for admitting electrolyte. This method utilises one type of sealing material deposited on both the WE and CE surface in combination with the controlled dispensing of electrolyte onto the active area surface of both substrates prior to complete sealing by an above described method such as roller sealing. In the example shown, eight cells are formed in a parallel arrangement using one continuous counter electrode substrate 230 formed from PEN which is pre laser isolated into a desired pattern defining rectangular counter electrodes. The continuous CE substrate 230 performs the role of carrier for the solar cell device.

The working electrode substrate 220 is formed from titanium foil. Three sides of each working electrode are defined by laser cutting the titanium foil. Areas of Titania are then applied to the working electrode areas and dyed.

Gasket material 222 is then applied about the four edges of the defined working electrodes and counter electrodes. The gaskets are applied to the working electrode substrate 220 and the counter electrode substrate 230. The gasket material is applied in corresponding rectangular shapes that surround the counter and working electrodes. The gasket material is applied via thermoplastic dispensing, film, fibre or hot melt screen printing. Then, a thin controlled volume layer of electrolyte 229 is deposited by spray, ink jet or similar method on the active areas of both of the counter and working electrodes. The substrates 220, 230 are then brought together and batch or continuous sealing is used to seal the sub-module. Once sealed, the fourth working electrode edge is removed and the excess substrate removed yielding a complete sub-module of eight cells 299. At this stage the sub-module 299 is ready for electrical interconnection and assembly into arrays for desired applications.

This manufacturing technique can be applied to any electrical design and any cell dimensions. According to size of processing equipment and available materials the substrates of any size can be processed and post cell sealing divided into sub-modules and/or single cells for subsequent processing into suitable arrays.

Figure 5:
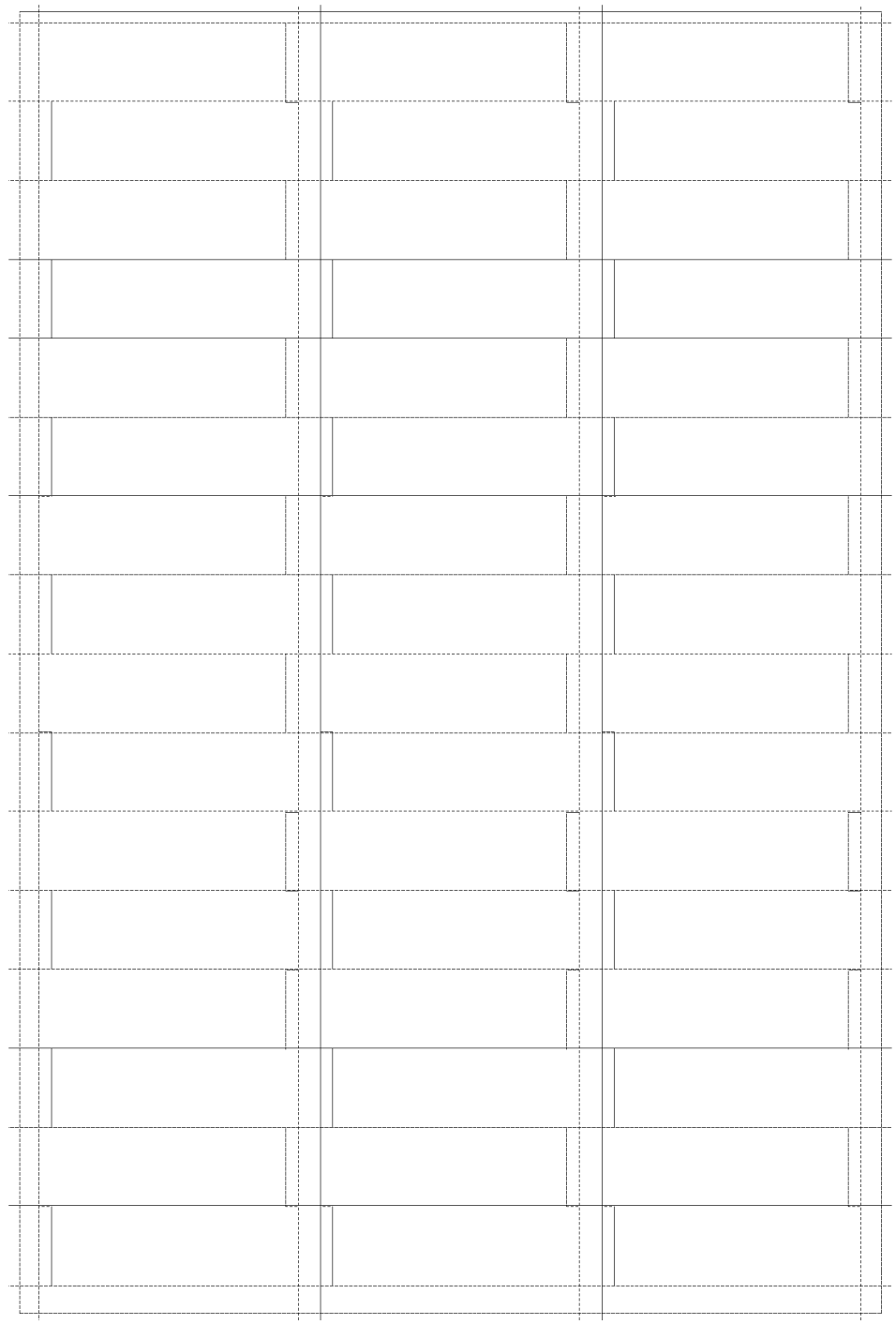
FIG. 5 shows a laser isolation pattern for a counter electrode substrate of a further embodiment of the invention.
Figure 6:
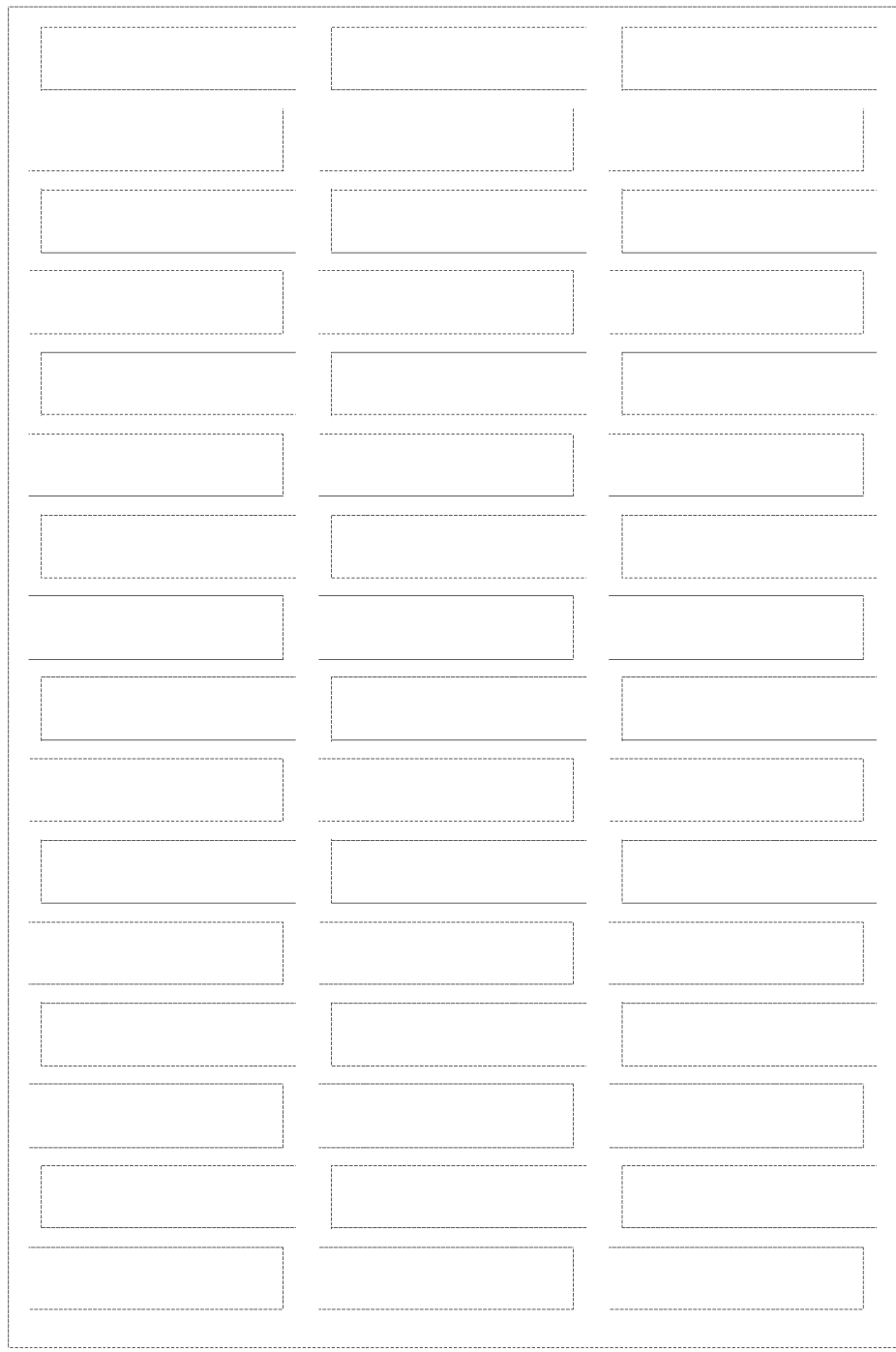
FIG. 6 shows a laser cutting pattern for a working electrode substrate to be assembled with the counter electrode of FIG. 5.
Figure 7:
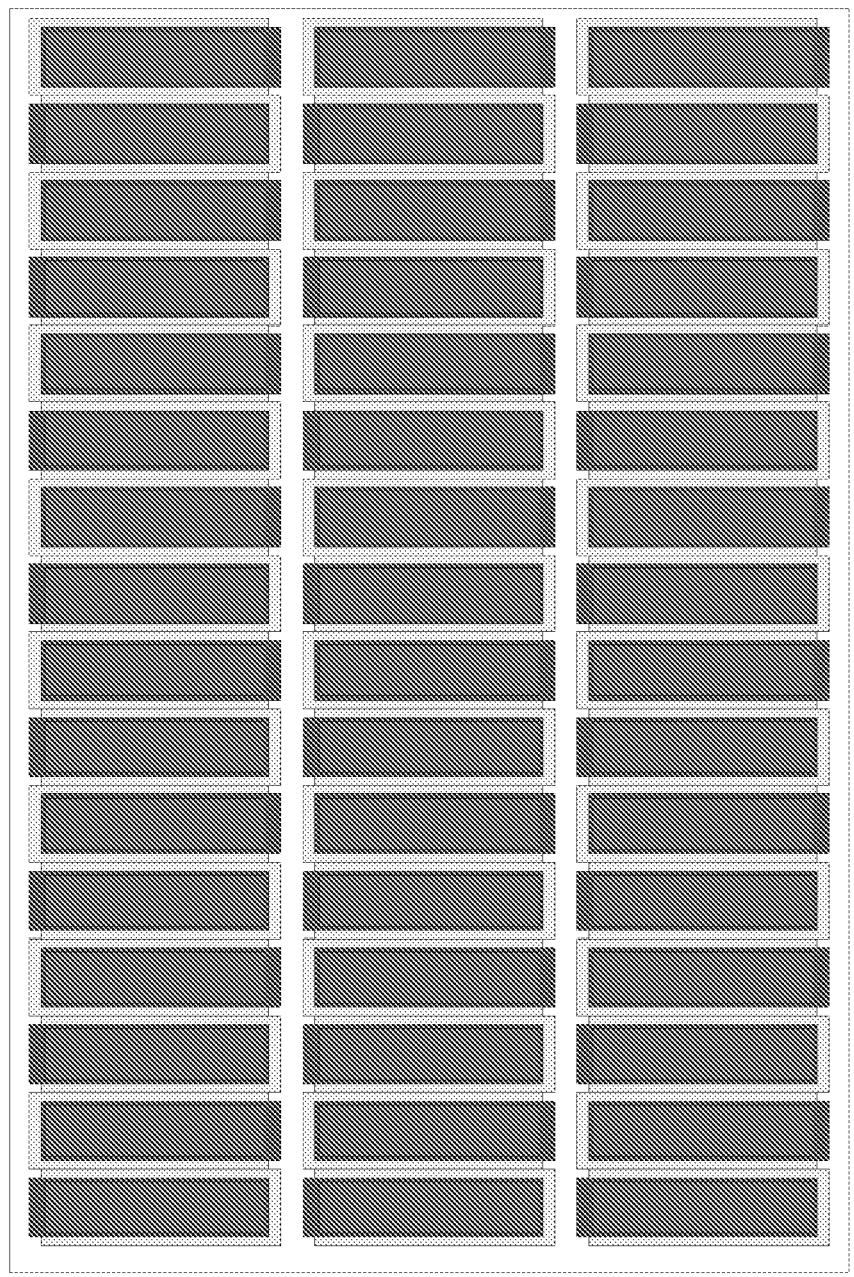
FIG. 7 shows a layout of cells formed in series using the substrates of FIGS. 5 and 6.
Figure 8:
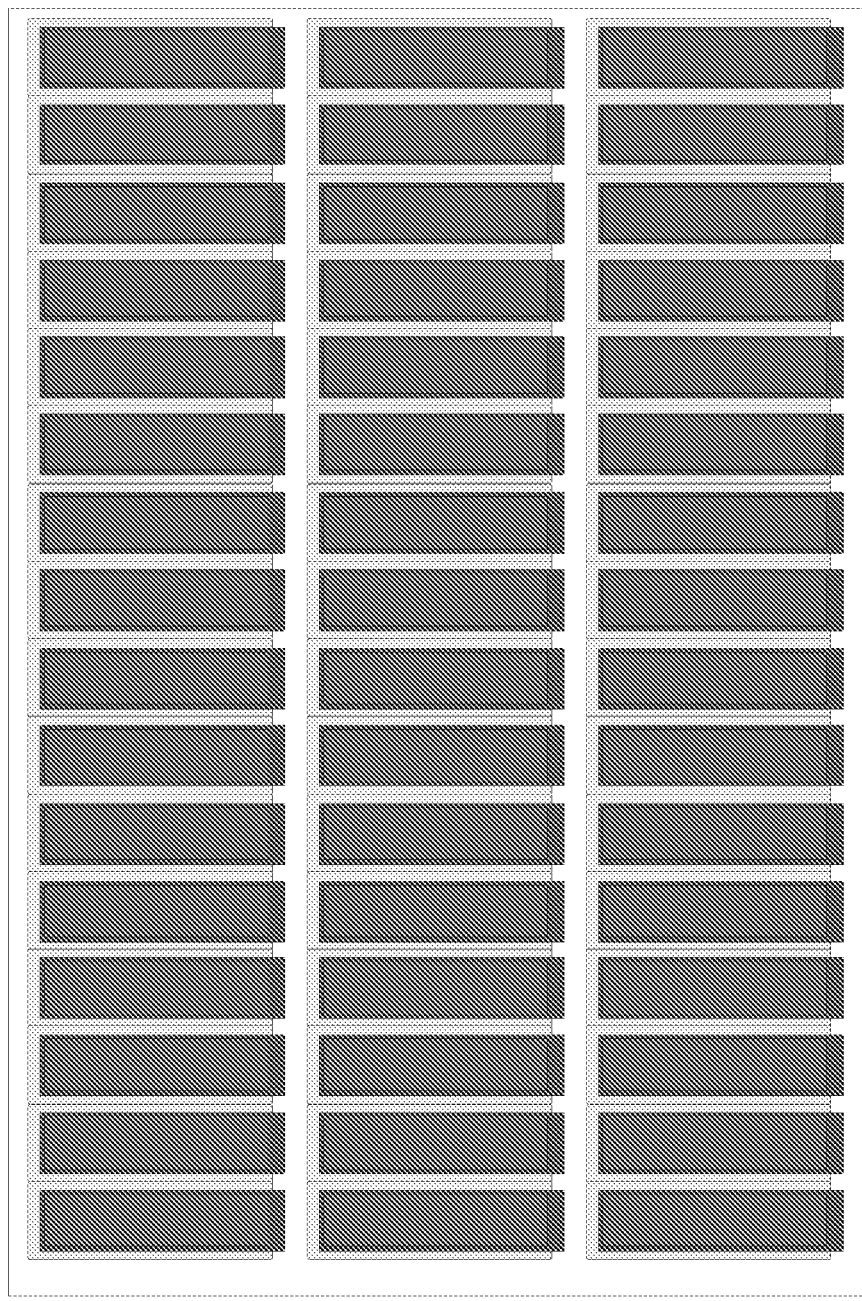
FIG. 8 shows a layout of cells similar to FIG. 7, but in a parallel configuration.

Schematic diagrams for substrates for use in forming a number of cells in series in an A4 layout are shown in FIGS. 5 and 6 respectively. FIG. 5 shows the laser isolation pattern for isolating regions of transparent conductive coating on a transparent film to define counter electrode regions. FIG. 6 shows the laser cutting pattern whereby three sides are cut to define the working electrodes. These allow for 3×16 cell rows to be formed yielding a total of 48 cells. These substrates are processed in a similar manner to that described for FIG. 4 to yield finished cells which are illustrated in FIG. 7. A further similar arrangement, this time with cells arranged in a parallel configuration is shown in FIG. 8.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A method for manufacturing at least one solar cell, the method comprising the sequential steps of:
   (a) providing at least two substrates;
   (b) at least partially forming at least one cell by applying portions of a low melting point gasket material to some regions of a substrate and applying portions of a high melting point gasket material to other regions of a substrate so that the low melting point gasket material defines a first portion of a perimeter of the cell and the high melting point gasket material defines a remaining second portion of the perimeter of the cell;
   (c) bringing the two substrates together;
   (d) activating the lower melting point gasket material to seal the first portion of the perimeter of the cell such that the lower melting point gasket material seals between the two substrates;
   (e) filling the at least one cell defined by the gasket materials with an electrolyte by passing the electrolyte through the unactivated second portion of the perimeter of the cell defined by the high melting point gasket material; and
   (f) activating the higher melting point gasket material to seal the second portion of the perimeter of the cell such that the higher melting point gasket material seals between the two substrates.

2. The method according to claim 1, further comprising the step of forming the at least one solar cell to be flexible.

3. The method according to claim 1, further comprising the step of forming the at least one solar cell as a photoelectrochemical cell.

4. The method according to claim 3, further comprising the step of forming the photoelectrochemical cell as a dye solar cell.

5. The method according to claim 1, further comprising the step of the substrates including either a metal foil or a coated metal foil.

6. The method according to claim 1, further comprising the step of the substrates including one a glass, a ceramic or a polymeric material.

7. The method according to claim 4, further including the step of applying a layer of semiconductor wherein the semiconductor of the dye solar cell is selected from the group consisting of titanium dioxide, ZnO, SnO2, niobium oxide or any combination of those materials with or without alkali and alkaline earth oxides, rare earth oxides, and other transition metal oxides or a semiconducting polymer.

8. The method according to claim 7, further comprising the step of depositing the semiconductor in one or more layers on a number of cells simultaneously by a technique selected from screen printing, doctor blading, spray deposition, dipping, tape casting, gravure printing or combination of these or similar technique to achieve a thickness after at least one of a heat and a pressure treatment of between 50 nm and 25 microns.

9. The method according to claim 8, further comprising the step of processing the substrate with deposited semiconductor by at least one of heat and pressure, with an option of deposition of a concurrent or subsequent application of a sol material to produce working electrodes suitable for dye application.

10. The method according to claim 9, further comprising the step of dying the electrodes with one or more dyes to produce a set of interconnected working electrodes.

11. The method according to claim 1, further comprising the step of the gasket materials including either of a polymeric gasket or ormocer gasket.

12. The method according to claim 11, further including the step of applying a catalyst whereby the catalyst may be dispersed as a Pt alloy or a Pt alloy or a mixture, carbon, PEDOT, Ru oxide or a combination thereof.

13. The method according to claim 12, further comprising the step of depositing the catalyst by one or more of screen printing, spraying, doctor blading, dipping, thermal decomposition, CVD, sputtering, PVD, chemical reduction and UV initiated reduction.

14. The method according to claim 1, wherein the steps of activating comprises the step of using a reflow oven to liquidize and subsequently cure on cooling the gasket material.

15. The method according to claim 1, wherein the steps of activating comprises the step of applying non-localized heat by a flat heat press or roller.

16. The method according to claim 1, further comprising the step of using either a redox electrolyte or a hole conductor as the electrolyte.

17. The method according to claim 1, further comprising the step of providing the electrolyte with pigment additives to achieve altered visual coloration.

18. The method according to claim 1, further comprising the step of introducing the electrolyte via an edge aperture.

19. The method according to claim 1, further including the step of depositing busbars onto a counter electrode, prior to cell assembly, by deposition of a heat curable or low temperature conductive ink or low temperature curing solder paste or a combination thereof.

20. The method according to claim 1, further comprising the step of using one of laser scribing or a jet milling cutting technique to separate the substrate.

21. The method according to any claim 1, further comprising the step of forming a plurality of solar cells between the substrates.

22. The method according to claim 21, further including the step of separating at least some of the at least partially formed cells by separating the substrates using a cutting technique.

* * * * *